US008404609B2

(12) United States Patent
Seal et al.

(10) Patent No.: US 8,404,609 B2

(45) Date of Patent: Mar. 26, 2013

(54) METHOD OF FORMING FUNCTIONALIZED FLY ASH PARTICLES

(71) Applicant: University of Central Florida Research Foundation, Inc., Orlando, FL (US)

(72) Inventors: Sudipta Seal, Orlando, FL (US); David L. Reid, Orlando, FL (US); Larry L. Hench, Fort Myers, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 13/655,756

(22) Filed: Oct. 19, 2012

(65) Prior Publication Data

US 2013/0040803 A1 Feb. 14, 2013

Related U.S. Application Data

(62) Division of application No. 13/180,161, filed on Jul. 11, 2011, now Pat. No. 8,318,625.

(60) Provisional application No. 61/363,028, filed on Jul. 9, 2010.

(51) Int. Cl.

| | |
|---|---|
| ***B01J 29/06*** | (2006.01) |
| ***B01J 20/18*** | (2006.01) |
| ***B01J 20/22*** | (2006.01) |

(52) U.S. Cl. ................ 502/60; 502/62; 502/63; 502/64; 502/73; 502/401; 502/407

(58) Field of Classification Search .................... 502/60, 502/62, 63, 64, 73, 401, 407
See application file for complete search history.

(56) References Cited

U.S. PATENT DOCUMENTS

2011/0112272 A1 5/2011 Seal et al.

OTHER PUBLICATIONS

Bannerjee et al., “Treatment of oil spills using organo-fly ash”, Desalination 195 (2006) 32-39.*
Karakasi et al., “Surface modification of high calcium fly ash for its application in oil spill cleanup”, Fuel 89 (2010) 3966-3970.*
Uerol et al., “Synthesis of zeolites from coal fly ash: an overview”, International Journal of Coal Geology, 50 (2002) 413-423.*

* cited by examiner

*Primary Examiner* — Elizabeth Wood
(74) *Attorney, Agent, or Firm* — Jetter & Associates, P.A.

(57) ABSTRACT

A method of forming functionalized fly ash particles includes contacting a plurality of fly ash particles with a hydroxide compound under conditions to directly bond oxygen (O) onto a surface portion of the plurality of fly ash particles. The plurality of fly ash particles having O directly bound to their surface portion are reacted with an organic alcohol or an organic acid to covalently bond hydrophobic groups in the form of condensation residue from the organic alcohol or organic acid to the O to form the plurality of functionalized fly ash particles.

12 Claims, 3 Drawing Sheets

METHOD OF FORMING FUNCTIONALIZED FLY ASH PARTICLES

CROSS-REFERENCE TO RELATED APPLICATIONS

This application is a divisional application of U.S. non-provisional patent application Ser. No. 13/180,161 entitled "FUNCTIONALIZED FLY ASH AND OIL SCAVENGING USING THE SAME" filed Jul. 11, 2011, now U.S. Pat. No. 8,318,625, which claims priority to provisional application Ser. No. 61/363,028 entitled "SURFACE FUNCTIONALIZED FLY ASH AND OIL SCAVENGING USING THE SAME" filed on Jul. 9, 2010, both of which are incorporated by reference in their entirety into this application.

FIELD

This Disclosure is related to functionalized fly ash particles and scavenging of oil, such as from oil spills, using the same.

BACKGROUND

An affordable and easily deployable solution to scavenge oil from oil spills is needed. It would also be desirable to recover the oil or the energy value from the oil scavenged from oil spills.

SUMMARY

One disclosed embodiment comprises a method of scavenging oil from an oil-water mixture. The method includes providing a plurality of functionalized fly ash particles having functionalized surfaces including a reactive surface portion having oxygen (O) directly bound thereto and hydrophobic groups comprising condensation residue from an organic alcohol or organic acid bound to the O. The oil-water mixture is then contacted with the plurality of functionalized fly ash particles.

The plurality of functionalized fly ash particles absorb oil from the oil-water mixture to form oil-laden fly ash particles. The oil-laden fly ash particles can be fed into a combustion process to generate heat from oil absorbed on the oil-laden fly ash particles, such as a combustion process that comprises combustion of coal. Alternatively, the absorbed oil can be separated from the oil-laden fly ash particles using a desorption process, and the oil can be recovered after the separating.

Also disclosed are compositions of matter comprising at least one functionalized fly ash particle comprising a bulk portion and a reactive surface portion having O directly bound thereto, and hydrophobic groups comprising condensation residue from an organic alcohol or organic acid bound to the O. The reactive surface portion can comprise zeolite.

Methods of forming functionalized fly ash particles are also disclosed. Such methods comprise an alkali treatment including contacting a plurality of fly ash particles with a hydroxide compound under conditions to add O to a surface portion of the fly ash particles. The plurality of fly ash particles having O bound thereto are then reacted with an organic alcohol or an organic acid to covalently bond hydrophobic groups to the O to form disclosed functionalized fly ash particles.

DETAILED DESCRIPTION

Figure 1:
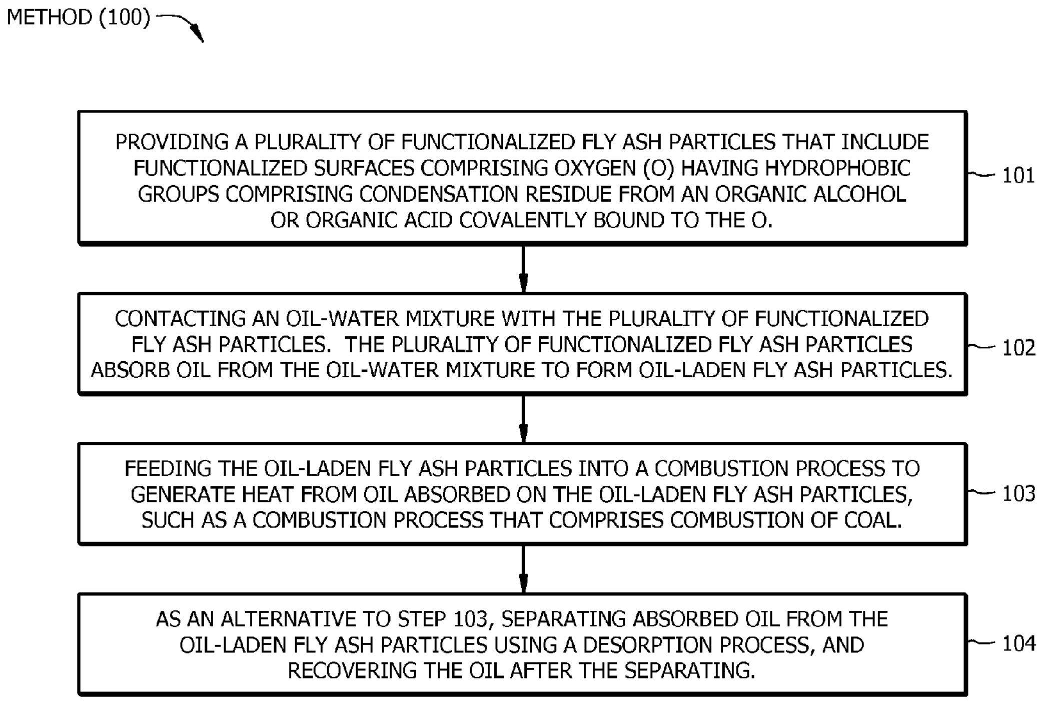
FIG. 1 is a flow chart depicting steps for an example method of scavenging oil from an oil-water mixture, according to an example embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed embodiments include functionalization of fly ash particles, with fly ash particles being known to be a waste material resulting from combustion of coal in electrical power plants, to absorb oil from an oil-water mixture. Disclosed embodiments allow handling of the oil spill waste in an environmentally friendly "green" manner that avoids adding oil spill waste to landfills, or burning the wastes and adding to air pollution. Disclosed embodiments also can include recovering the oil scavenged from oil spills or the energy value from the oil scavenged.

The entire chemical surface functionalization method describe herein can in certain embodiments be performed at low temperatures (e.g., 100° C. or below), and consume a small amount of chemicals. Disclosed embodiments are therefore low cost, and moreover, capable of producing very large quantities of functionalized fly ash material in powder form.

Fly ash particles can be generally captured from the chimneys of coal-fired power plants, or be obtained from providers that perform such capturing, and is one of two types of ash that jointly are known as coal ash. The other, bottom ash, is removed from the bottom of coal furnaces. In 2007, 131 million tons of coal combustion products, mostly fly ash, were produced in the United States (U.S.). Nearly 75 million tons of coal combustion products were disposed of in landfills in the U.S. on 2007.

Depending upon the source and makeup of the coal being burned, the components of fly ash vary considerably, but all fly ash generally include substantial amounts of silicon dioxide ($SiO_2$) and aluminum oxide ($Al_2O_3$) in the form of complex chemical mixtures of silicon oxide and aluminum oxides, known as alumino-silicates, as either amorphous or polycrystalline phases, with variable amounts of calcium oxide (CaO), all being endemic ingredients in many coal bearing strata.

As used herein, "fly ash" refers to the residue from the combustion of powdered or ground coal. Fly ash carried by flue gases may be recovered, for example, by electrostatic precipitation. A variety of fly ashes may be suitable for disclosed embodiments, including fly ash classified as Class C and Class F fly ash according to American Petroleum Institute, API Specification for Materials and Testing for Well Cements, API Specification 10, Fifth Ed., Jul. 1, 1990. Class F fly ash is produced from the burning of harder, older anthracite and bituminous coal. This fly ash is pozzolanic in nature, and contains less than 10% lime. Class C fly ash is produced from the burning of younger lignite or subbituminous coal, in addition to having pozzolanic properties, also has some self-cementing properties. In the presence of water, Class C fly ash generally contains more than 20% lime.

The Inventors have recognized that fly ash particles have low oil sorption capacity due to their relatively low surface area and its formation at very high combustion temperatures leading to a composition having a hydrophilic surface. Simply increasing the surface area of fly ash by a solution-phase treatment can increase its sorption capacity for hydrophilic compounds, but this material is still unsuitable for oil sorption. Hydrophobic surface-functionalization of laboratory-synthesized silica aerogels has been shown to produce a many-fold increase in oil sorption capacity, but these materials are expensive and are thus impractical for large-scale use.

As discovered by the Inventors, it is possible to tailor the surface properties of fly ash particles by an inexpensive, generally low temperature process that substantially increases the surface area of fly ash or other ceramic powders (e.g., alumino-silicate powders) through adding hydrophobic groups by surface functionalization that greatly increase the capacity for adsorption of hydrophobic oil molecules. In one embodiment, disclosed surface-functionalized fly ash particle powders can be placed in a low-cost oil-permeable mesh packaging material for use in oil clean-up operations following oil spills.

FIG. 1 is a flow chart depicting steps for an example method 100 of scavenging oil from an oil-water mixture, according to an example embodiment. Step 101 comprises providing a plurality of functionalized fly ash particles that include a bulk portion and a surface portion having a surface area, with (i) O directly bound to the surface portion, and (ii) hydrophobic groups comprising condensation residue from an organic alcohol or organic acid covalently bound to the O. The surface portion renders disclosed functionalized fly ash particles more chemically reactive as compared to raw (non-modified) fly ash particles. The hydrophobic groups can comprise alkoxide groups or carboxylic (RCOO) groups. The plurality of functionalized fly ash particles can be provided within an oil-permeable mesh packaging material.

Step 102 comprises contacting an oil-water mixture with the plurality of functionalized fly ash particles. The plurality of functionalized fly ash particles absorb oil from the oil-water mixture to form oil-laden fly ash particles. The functionalized fly ash particles generally become saturated with oil over a period of seconds to minutes upon contact with the oil/water mixture.

Step 103 comprises feeding the oil-laden fly ash particles into a combustion process to generate heat from oil absorbed on said oil-laden fly ash particles, such as a combustion process that comprises combustion of coal. As an alternative to step 103, step 104 can comprise separating absorbed oil from the oil-laden fly ash particles using a desorption process, and recovering the oil after the separating.

Figure 2:
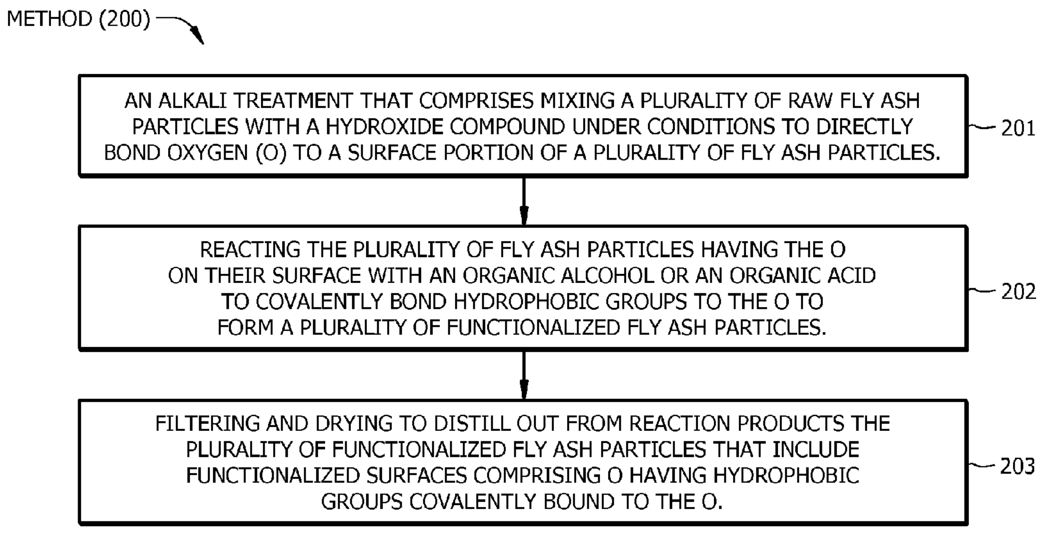
FIG. 2 is a flow chart depicting steps for an example method for forming functionalized fly ash particles, according to an example embodiment.

FIG. 2 is a flow chart depicting steps for an example method 200 for forming functionalized fly ash particles, according to an example embodiment. As described above, most reactants can be recycled. The first step in the method involves an alkali treatment step 201 that comprises mixing raw fly ash particles with a hydroxide compound under conditions to bond O directly the surface portion of the fly ash particles, typically as OH groups or a zeolite layer. For example, the raw fly ash particles can be combined with water and a hydroxide (OH) compound such as an alkali metal hydroxide (e.g., sodium hydroxide (NaOH) potassium hydroxide (KOH), or lithium hydroxide (LiOH)).

A typical alkali metal hydroxide concentration is in the range from 4 to 10 moles per liter. The exposure time generally ranges from 1 hour to 48 hours, and can vary with the concentration and type of hydroxide species. The alkali treatment step can be performed at a temperature typically ranging from room temperature (25° C.) to 150° C. In one embodiment the hydroxide group partly functionalizes the fly ash by attaching itself to the surface of the fly ash particles (e.g., alumina and silica), creating hydroxide bonds and consequently a coarser and more reactive fly ash surface as compared to an unmodified fly ash surface.

The hydroxide groups on the surface of the partly functionalized fly ash, now providing chemically activated surfaces, allow its inorganics, such as alumina and silica, as described in the paragraph below, to react with organic alcohols or organic acids in a subsequent step. The partly functionalized particles can then be washed with deionized water and filtered and finally with aqueous hydrochloric acid (HCl) or other low pH acids or chemicals, and then dried in an ambient atmosphere. Water and residual hydroxide compounds such as NaOH in the wash solution can be recycled back to the first reaction (step 201).

The alkali treatment conditions can be selected to be substantially more aggressive as compared to the conditions described above for attaching hydroxide groups to the fly ash particle surface, to instead form zeolite surfaces on the surface of the fly ash particles. For example, more aggressive combinations of chemical reaction variables can comprise a temperature$\geqq$100° C. (e.g., 120 to 200° C.), an alkali concentration$\geqq$5M, and time$\geqq$1 hr. The fly ash particle surface can be partially converted to zeolite, or fully converted to zeolite to provide a continuous zeolite layer on the surface. The zeolite layer generally extends a depth of 1 to 10 μm in from the outer surface of the fly ash particles.

As known in the art, zeolites are defined as microporous crystalline hydrated aluminosilicates of alkali and alkaline earth cations, having essentially infinite, three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or 0/(Al+Si)=2. The electrovalence of each tetrahedra containing aluminum is balanced by the inclusion in the crystal of a cation, for example, a sodium ion. This balance may be expressed in the case of sodium by the formula Al/Na=1. The spaces between the tetrahedra may be occupied by water molecules prior to dehydration.

In the zeolite embodiment, the alkali treatment conditions are selected so that a fraction of the alkali metal ions (e.g. $Na^+$, $K^+$, $Li^+$) from the alkali treatment become incorporated into the fly ash alumino-silicate surface to form a highly reactive layer of zeolitic phases on the surface of the fly ash particles. If the alkali treatment is conducted at too low a temperature, for too short a time, or with insufficient alkali concentration, then there will be incomplete (or in the limit no) zeolite surface coverage, and the fly ash particle surface will instead add hydroxide groups as disclosed above. In one particular embodiment, a temperature of ≧100° C. (e.g., 120 to 200° C.), an $OH^-$ concentration of at least 10 M, and a reaction time of 4 to 8 hours has been found to provide complete zeolite surface coverage.

The resulting zeolitic surface structures are based on the starting composition of the reacting fly ash materials, such as the Si/Al/Ca ratios. For example, disclosed zeolitic phases can be based on the sodalite, cancrinite, and sillimanite crystal structures grown on the fly ash particles. The high surface area and porosity of zeolitic surface structures are ideal for a high sorbent capacity and for use as catalysts. Additives such as solution-phase templating agents, including tetramethylammonium hydroxide or similar compounds, as well as a variety of compounds classified as ionic surfactants, may be used to tailor the zeolite growth and increase the surface area and pore volume of fly ash particles with the zeolitic surfaces. The zeolite surface is highly hydrophilic, so step 202 described below is generally included to covalently bond hydrophobic groups to the zeolite surface for oil scavenging applications.

One important feature of a disclosed zeolite surface is the very high surface area provided, which increases with decreasing crystal size. The crystal size of the zeolite crystals formed based on the methods described herein typically averages<10 microns in at least one length dimension, and generally averages<1 micron in at least one length dimension. The high surface area maximizes the surface area available for oil adsorption. Step 202 comprises reacting the O (e.g., from a hydroxide group or zeolite) on the surface of the plurality of fly ash particles with an organic alcohol or an organic acid to covalently bond hydrophobic groups comprising condensation residue from an organic alcohol or organic acid to the O. The organic alcohol or organic acid generally has 2 or more carbons (e.g., 2 to 20 carbons) that react to add organic functional groups covalently bound to the O to complete the surface functionalization of the fly ash particles. Step 203 comprises filtering and drying to distill out from the reaction products the functionalized fly ash particles that include functionalized surfaces comprising condensation residue from an organic alcohol or organic acid covalently bound to the O.

For the organic alcohol case, the partly functionalized fly ash powder particles can be added into the solution with an acid such as sulfuric acid, while stifling continuously to obtain a low pH, typically in the pH range of about 2-4, at a temperature range from 25-100° C. During this reaction, the organic alcohol reacts with the OH surface of the fly ash particles, forming covalently bound surface alkoxides by etherification with the removal (dehydration) of water. The reaction with the organic alcohol can be written as:

$$CH_3(CH_2)nOH + S\text{—}OH \xrightarrow{H_2SO_4} S\text{—}O(CH_2)\,nCH_3 + H_2O$$

where S refers to the surface of the fly ash particles. The strong acid shown as sulfuric acid for example, is used to decrease the pH of the solution, catalyze the etherification reaction, and remove the water formed during the reaction, driving the reaction forward.

For the organic acid embodiment, the organic acid can comprise a carboxylic acid or a fatty carboxylic acid. The reaction with the organic acid can be written as:

$$CH3(CH2)nCOOH+S\text{—}OH\text{---->}S\text{—}OOC(CH_2)nCH_3+H_2O$$

wherein as before S is the surface of the fly ash particles. In one example, a fatty carboxylic acid, such as stearic acid, is dissolved at elevated temperature, e.g. 80° C., in water containing a 2:1 molar ratio of NaOH to stearic acid. Fly ash, having been activated by the alkali surface treatment described above to form partly functionalized fly ash surfaces (S—OH), is added to this mixture, which is then allowed to cool (e.g., to room temperature), causing a reaction in which the carboxylic acid such as stearic acid precipitates and coats the S—OH surfaces of the fly ash particles. In this embodiment step 203 can comprise filtering the precipitate and particles to remove excess water and alkali (e.g., NaOH). A heating step can follow comprising heating to an elevated temperature, e.g. 160° C., for a period of time, causing the covalent bonding of fatty acid to the partly functionalized fly ash surfaces (S—OH) to form S—$OOC(CH_2)nCH_3$. Unreacted fatty acid and NaOH can be removed from the now hydrophobic powder by washing with hot water.

The distillation process described above in step 203 also helps to drive off the water generated during the reaction and pushes the reaction further forward. The chemical reactions occurring during this process create a functionalized surface on fly ash powders with a high area density that is at least 20%, and generally from 20 to 80%, of the surface area containing the functionalized hydrophobic groups of hydrophobic groups.

Figure 3A:
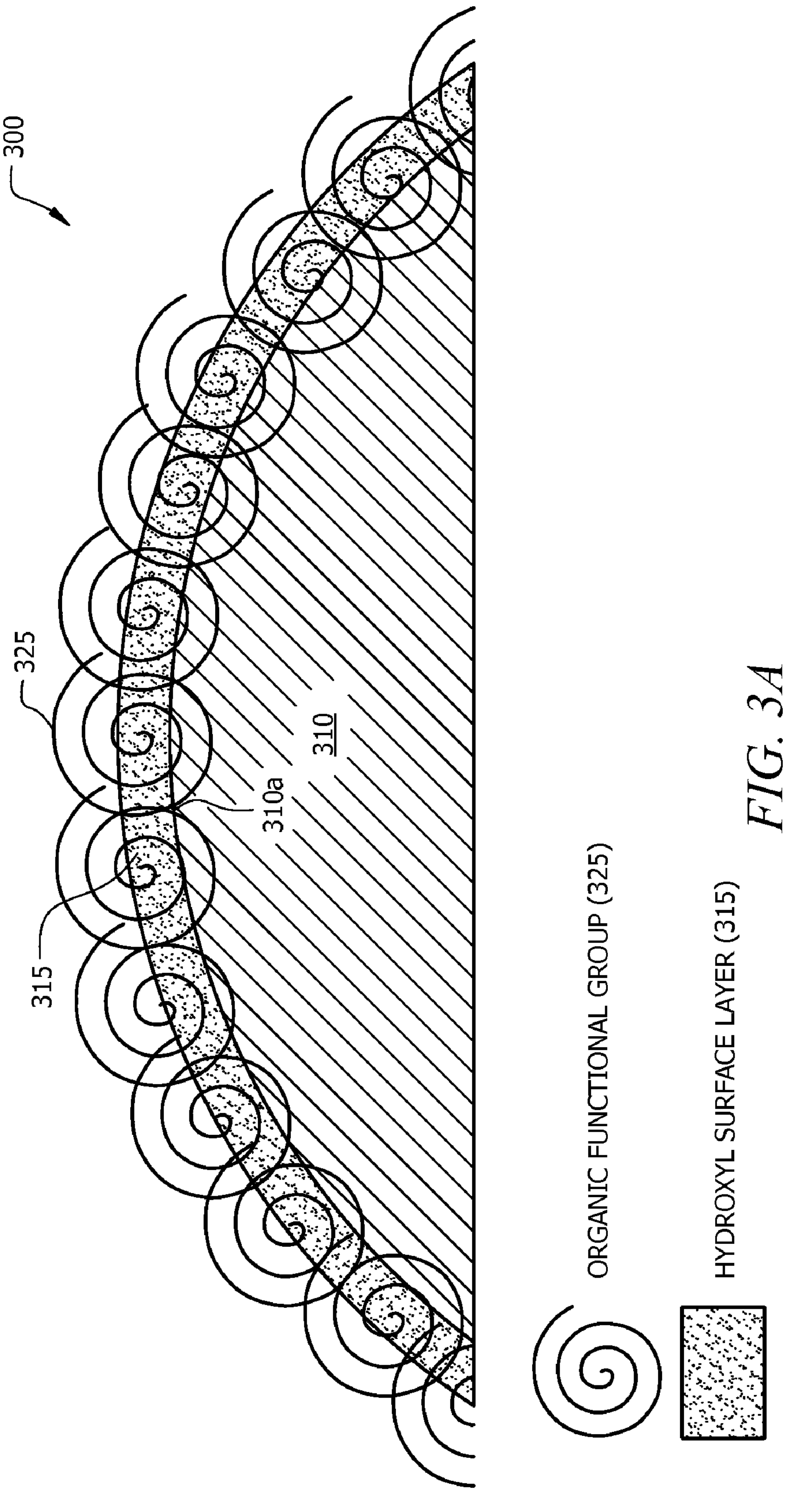
FIG. 3A depicts an example functionalized fly ash particle section comprising a bulk portion and functionalized surfaces on the bulk portion comprising reactive groups shown as a hydroxyl layer, and hydrophobic groups shown as organic functional groups covalently bound to the hydroxyl layer, according to an example embodiment.

FIG. 3A depicts an example functionalized fly ash particle section 300 comprising a bulk portion 310 including a surface portion 310*a* having functionalized surfaces thereon comprising a group including O directly shown as a hydroxyl surface layer 315 and hydrophobic groups 325 covalently bound to the hydroxyl surface layer 315, according to an example embodiment. The hydrophobic groups are shown as organic functional groups 325 that can comprise alkoxide groups, or carboxylic (RCOO) groups. The hydrophobic groups 325 increase the porosity and surface area of disclosed functionalized fly ash particles for example functionalized fly ash particle section 300 as compared to the surface of a raw fly ash particle.

Figure 3B:
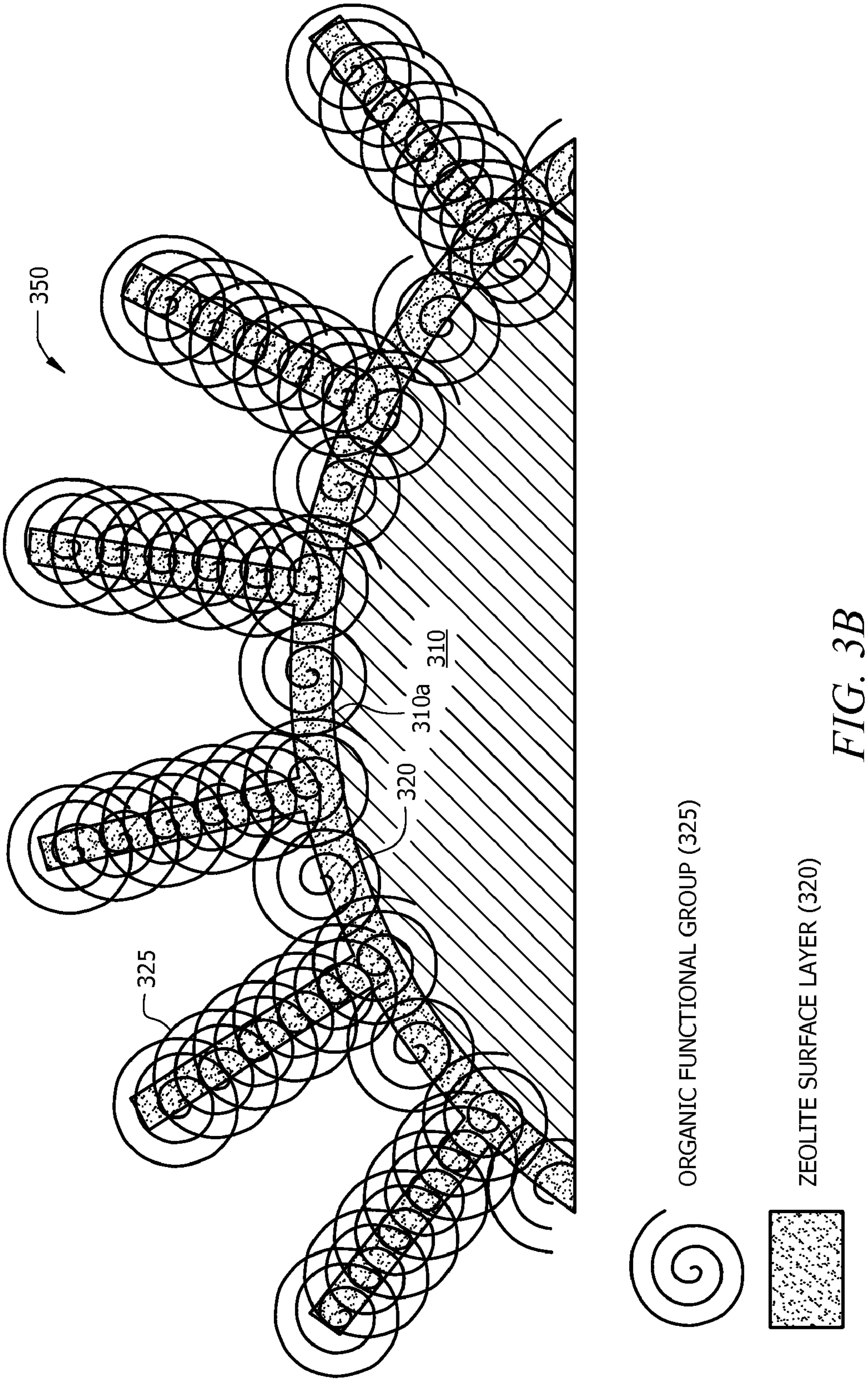
FIG. 3B depicts an example functionalized fly ash particle section comprising a bulk portion, and functionalized surfaces on the bulk portion comprising a zeolite surface layer and hydrophobic groups shown as organic functional groups covalently bound to the zeolite layer, according to an example embodiment.

FIG. 3B depicts an example functionalized fly ash particle section 350 comprising a bulk portion 310 including a surface portion 310*a* having functionalized surfaces thereon comprising a zeolite surface layer 320, and hydrophobic groups 325 covalently bound to the zeolite surface layer 320, according to an example embodiment. The zeolite surface layer 320 is shown being a continuous layer, although as described above disclosed embodiments include discontinuous zeolite layers as well. The hydrophobic groups shown as organic functional groups 325 can comprise alkoxide groups, or carboxylic (RCOO) groups. The zeolite surface layer 320 generally extends out a depth of 1 to 10 μm in from the outer edge of the surface portion 310*a* of the former raw fly ash particle, such as least 2 to 4 μm.

Due to the presence of a zeolite surface, functionalized fly ash particles based on functionalized fly ash particle section 350 have significantly increased surface area and porosity as compared to a non-zeolite fly ash particle surface, such as compared to the surface of a raw fly ash particle, or even functionalized fly ash particles based on functionalized fly ash particle section 300 depicted in FIG. 3A. Example functionalized fly ash particles have many potential applications based on the presence of zeolites. For oil sorption capacity for oil scavenging, the surface area and porosity are generally most important particle parameters.

Unconsumed materials can be recycled. For the organic alcohol case, alcohol and acid (e.g. sulfuric acid) can be recycled. Finally, the functionalized particles are filtered and washed with alcohol (e.g., ethanol or methanol) to remove leftover acid from the product material. The washed functionalized powder can be dried overnight and stored in a sealed container. The alcohol (ethanol or methanol) used in the filtering process can be recycled. The final product is a dry, hydrophobic powder with a very high specific surface area, with a high capacity for adsorption of oil molecules.

The Inventors have recognized that several tailorable process parameters are available to obtain a range fly ash particle parameters. For example, the specific surface area, pore size, and total pore volume of the fly ash can be tailored by changing process parameters of the alkali treatment step as described above, such as temperature, alkali concentration, alkali content (e.g. concentration ratios of NaOH to KOH and other alkalis), and time. Other tunable process parameters include additives such as tetramethylammonium hydroxide, and other surfactants and templating agents.

Disclosed embodiments are further illustrated by the following specific Examples, which should not be construed as limiting the scope or content of this Disclosure in any way.

Fly ash was obtained from a power company and was surface functionalized by hydroxide treatment (using NaOH) followed by treatment with n-octanol. A high magnification SEM image of a resulting functionalized fly ash particle was compared to an unmodified fly ash particle obtained from a power company was found to provide a 10× increase in surface area from 4 $m^2g^{-1}$ to 40 $m^2g^{-1}$r. The high surface area of disclosed functionalized particles enable absorbing increased amounts of oil from oil-water mixtures due to the presence of unique surface functional groups on the particle surface.

Measured masses of the sorbent including unmodified fly ash (as a control) and disclosed n-octanol functionalized fly ash in separate tests were mixed with motor oil and allowed to stand for 30 minutes, then centrifuged at 10,000 rpm for 10 minutes. The amount of oil adsorbed was taken as the difference between the initial amount of oil added and the amount removable by decantation. The resulting oil sorption capacities, in grams oil adsorbed per gram sorbent, were found to be almost 0.76 g/g for disclosed n-octanol functionalized fly ash sorbent while being about 0.22 g/g for the unmodified fly ash sorbent, thus increasing the oil sorption capacity of fly ash by 340%. This result is proof that disclosed methods can be adapted to substantially increase the oil sorption capacity of conventional fly ash.

It is noted that other ceramic particles, such as silica sand, silicate and alumino-silicate mining tailings, may be used together with disclosed functionalized fly ash particles. By optimizing the various process parameters (e.g., process time, temperature, choice of solvent, pH, and functionalizing agent), including the type of functionalizing agent to maximize the surface area and hydrophobicity, the oil sorption capacity of these materials may be increased significantly beyond the above-described result.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method of forming functionalized fly ash particles, comprising:

an alkali treatment comprising contacting a plurality of fly ash particles with a hydroxide compound under conditions to directly bond oxygen (O) onto a surface portion of said plurality of fly ash particles, and reacting said plurality of fly ash particles having said O directly bound to said surface portion with an organic alcohol or an organic acid to covalently bond hydrophobic groups comprising condensation residue from said organic alcohol or said organic acid to said O to form said functionalized fly ash particles.

2. The method of claim 1, wherein said reacting comprises reacting said plurality of fly ash particles having said O directly bound to said surface portion and said organic alcohol in an acid environment, and wherein said hydrophobic groups comprise alkoxide groups.

3. The method of claim 2, wherein a pH during said reacting is between 2 and 4.

4. The method of claim 1, wherein said reacting comprises reacting said plurality of fly ash particles having said O directly bound to said surface portion and said organic acid, and wherein said hydrophobic groups comprise carboxylic (RCOO) groups.

5. The method of claim 1, wherein said conditions for said alkali treatment are selected to form a zeolite surface layer on said surface portion, and wherein said hydrophobic groups are covalently bound to said zeolite layer.

6. The method of claim 1, wherein a crystal size said zeolite layer averages<10 microns in at least one dimension.

7. The method of claim 1, wherein said conditions comprise a temperature≧100° C., an alkali concentration from said hydroxide compound of ≧5M, and time≧1 hr.

8. The method of claim 1, further comprising filtering and washing said functionalized fly ash particles with an alcohol, and then drying.

9. The method of claim 1, wherein said reacting is performed at a temperature≦100° C.

10. The method of claim 1, wherein said hydrophobic groups cover at least 20% of a surface area of said surface portion.

11. The method of claim 10, wherein said hydrophobic groups cover 20% to 80% of said surface area.

12. The method of claim 1, wherein said organic alcohol or said organic acid has between 2 and 20 carbons.

* * * * *